United States Patent [19]
Ashford et al.

[11] Patent Number: 4,662,448
[45] Date of Patent: May 5, 1987

[54] WELL TREATMENT METHOD USING SODIUM SILICATE TO SEAL FORMATION

[75] Inventors: James D. Ashford; James K. Eastlack; Gary D. Herring, all of Anchorage, Ak.; William N. Wilson, Plano, Tex.

[73] Assignee: Atlantic Richfield Company, Los Angeles, Calif.

[21] Appl. No.: 855,660

[22] Filed: Apr. 25, 1986

[51] Int. Cl.⁴ .......................................... E21B 33/138
[52] U.S. Cl. ...................................... 166/290; 166/292
[58] Field of Search ................. 166/292, 290; 106/74, 106/84, DIG. 4

[56] References Cited

U.S. PATENT DOCUMENTS

| | | | |
|---|---|---|---|
| 1,661,270 | 3/1928 | Ryder et al. | 166/290 X |
| 2,207,759 | 7/1940 | Reimers | 166/292 |
| 2,805,719 | 9/1957 | Anderson | 166/292 |
| 2,868,295 | 1/1959 | Brooks, Jr. et al. | 166/292 |
| 3,100,530 | 8/1963 | Coleman et al. | 166/290 X |
| 3,111,006 | 11/1963 | Caron | 166/292 X |
| 3,335,795 | 8/1967 | Richards et al. | 166/290 X |
| 4,505,751 | 3/1985 | Sydansk | 166/292 X |
| 4,531,583 | 7/1985 | Revett | 166/290 X |

OTHER PUBLICATIONS

Herring et al., SPE 12473, "Selective Gas Shut-Off Using Sodium Silicate in the Prudhoe Bay Field, Ak.", Feb. 13-14, 1984.

*Primary Examiner*—George A. Suchfield
*Attorney, Agent, or Firm*—Drude Faulconer; F. Lindsey Scott

[57] ABSTRACT

A squeeze silicate operation carried out through a coiled tubing for sealing upper perforations in a well casing to prevent flow of excess gas. A sodium silicate mixture is used which has a diverter material therein which rapidly builds a filter cake on the formation as the silicate is squeezed through the perforations. This filter cake forms a barrier which, in turn, prevents further flow of silicate into the formation. This effectively limits the depth of penetration of the silicate into the formation while still providing a good seal against flow through the squeezed perforations.

16 Claims, 3 Drawing Figures

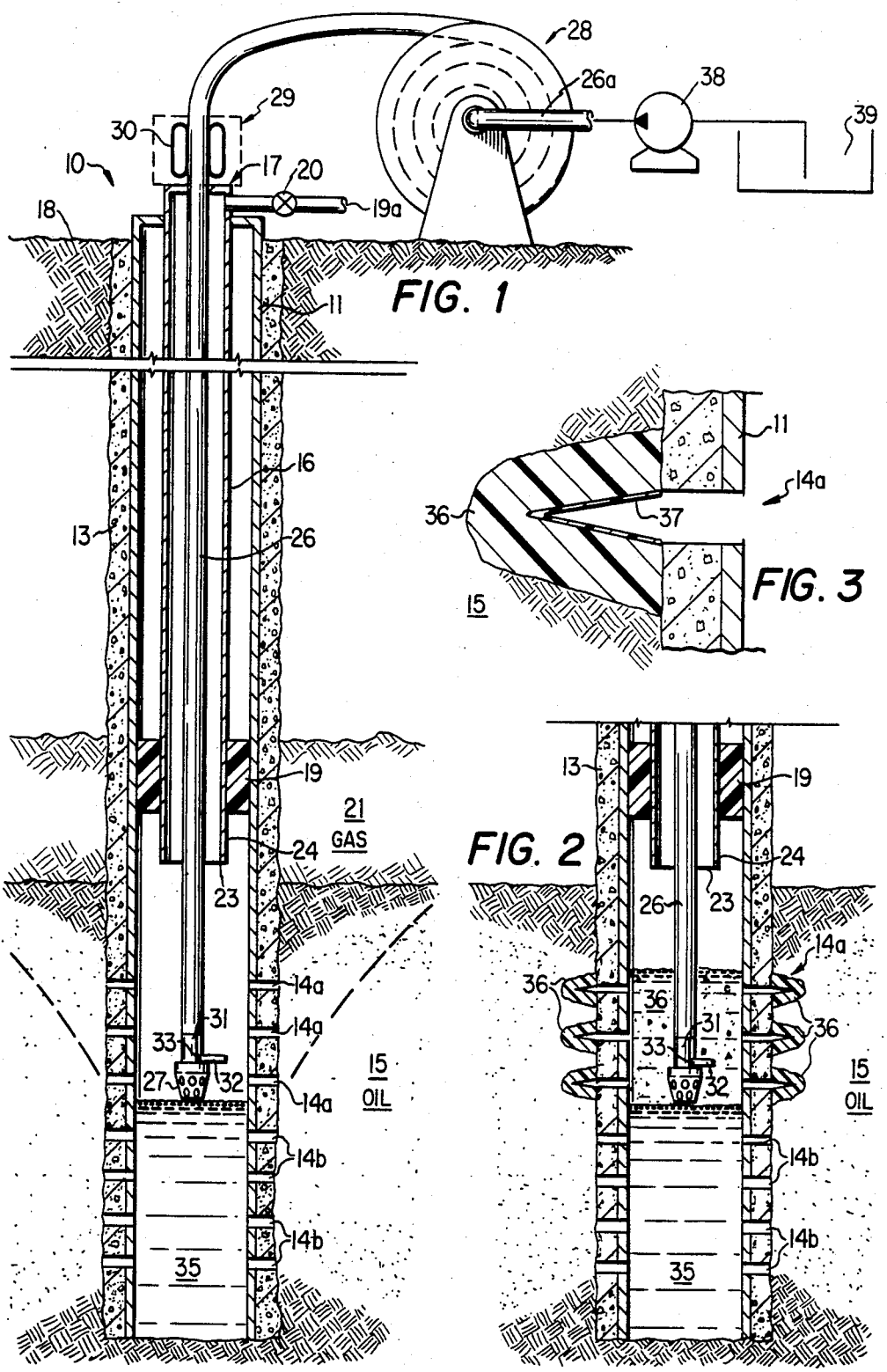

WELL TREATMENT METHOD USING SODIUM SILICATE TO SEAL FORMATION

DESCRIPTION

1. Technical Field

The present invention relates to a method of treating a hydrocarbon producing formation to alleviate excess gas production and more particularly relates to a method for injecting a sealing material, e.g. sodium silicate mixture, through a coiled tubing into a gas-producing formation through perforations in a well casing to prevent flow therefrom.

2. Background Art

In completing a typical hydrocarbon producing well, the wellbore is cased after the well is drilled. The casing is perforated adjacent the producing formation to allow the production fluids, e.g. oil, gas, water, to flow into and through the casing to the surface.

As will be understood in the art, it is not uncommon for excess gas from an overlying gas cap to migrate downward into the permeable producing formation as production fluids are produced therefrom.. When this gas reaches the upper perforations in the casing, it is produced along with the other fluids thereby causing undesirably high gas-to-oil ratios.

When such high gas-to-oil ratios are detected, the well is normally treated to shut-off flow of this excess gas through the upper perforations in the casing. One such method of treating a well is described in SPE paper 12473, "Selective Gas Shut-Off Using Sodium Silicate in the Prudhoe Bay Field, AK", Herring et al, presented at the Formation Damage Control Symposium in Bakersfield, CA, Feb. 13-14, 1984. In this method, the well is first fluid packed by loading the casing with diesel. A coiled tubing is then lowered and a temporary bridging agent, e.g. salt weighted polymer gel, is flowed therethrough into the lower end of the casing to isolate and protect the lower, oil-producing perforations. Activated sodium silicate is then pumped through the coiled tubing and onto the top of the bridging agent and is "squeezed" into the formation through the upper, unprotected perforations in the casing. The well is then closed in for an extended period until the silicate hardens to seal-off the excess gas flow. Water is jetted through the coiled tubing to dislodge any remaining silicate from the casing and to remove the bridging agent from the well.

While the above method and other similar methods which use sodium silicate have been successful in alleviating excess gas production, there are still problems involved in using such methods. For example, the liquid silicate, when injected under pressure, has a tendency to penetrate deeply into the permeable gas-producing formation. This is undesirable since when the silicate sets, the treated zone can not be easily re-entered later without first hydraulically fracturing the sealed zone. Also, since silicate is liquid until it sets, it is difficult to hold a positive wellbore pressure on the unset silicate during the curing period which is necessary to prevent the silicate from flowing back into the casing when the formation pressure is greater than the wellbore pressure.

In view of the above, it can be seen that in a squeeze operation using sodium silicate as the sealing material it is desirable to limit the penetration of the sodium silicate into the formation and to be able to maintain a positive pressure on the silicate within the pore spaces of the formation until it hardens.

DISCLOSURE OF THE INVENTION

The present invention provides a squeeze silicate operation for sealing a producing formation adjacent upper perforations in a well casing to prevent flow of excess gas into the casing which provides several advantages over previously owned techniques. In the present invention, a sodium silicate mixture 15 is used which has a diverter material (e.g. bentonite, barite, silica flour) therein which rapidly builds a filter cake on the formation as the silicate is squeezed through the perforations. This filter cake forms a barrier which, in turn, prevents further flow of silicate into the formation. This effectively limits the depth of penetration of the silicate into the formation while still providing a good seal against flow through the squeezed perforations.

Further, when the filter cake forms to block flow of silicate into the formation, the pump pressure will "bump" thereby notifying the operator that the formation will not take any further silicate. It is then possible to maintain a positive pressure in the casing while the silicate in the formation is setting so that no liquid silicate in the formation will flow back into the casing. Also, in the present invention, the excess silicate remaining in the casing after the perforations are squeezed can be contaminated to retard its setting time so that it can be circulated out of the casing after the silicate in the formation has hardened.

More specifically, the present invention provides a squeeze silicate operations that is carried out with a coiled tubing which does require the use of a workover rig. Further, neither mud nor a "kill pill" is required since the wellbore is loaded only with clean, filtered fluid which allows the perforations and formation to take fluid easily without formation breakdown. Still further, the present method can be carried out without pulling and replacing the production tubing and the well can remain connected to its production facility thereby allowing flowback to clean casing perforations and flow testing the squeeze.

In carrying out the present invention, the wellbore is loaded with a loading fluid (e.g. production water, diesel, etc.) and a temporary bridging agent is placed in lower end of the casing through the coiled tubing to isolate the casing adjacent the perforations to be squeezed. The bridging agent (e.g. heavily-weighted mud or brine) is placed across lower perforations in the casing which are not to be squeezed to isolate and protect same during the squeeze operation. The density of the bridging agent is equal to or greater than the density of the silicate to be used to prevent any substantial mixing of the two.

The sodium silicate mixture including the diverter material is flowed through the coiled tubing on the bridging agent and is squeezed through the unprotected upper perforations. The diverter builds up a filter cake on the formation as the silicate mixture flows through the perforations so that the filter cake buildup quickly blocks off flow of silicate into the formation. This limits the depth into the formation to which the silicate can penetrate. Flow of silicate is then stopped and a positive pressure is maintained in the wellbore until the silicate in the formation sets. The excess silicate and the bridging agent is then removed from the wellbore.

BRIEF DESCRIPTION OF THE DRAWINGS

The actual construction, operation, and apparent advantages of the present invention will be better understood by referring to the drawings in which like numerals identify like parts and in which:

FIG. 1 is a sectional view of well showing an early step of the squeeze silicate method of the present invention;

FIG. 2 is a sectional view of the lower end of the well of FIG. 1 showing a further step of the present squeeze silicate method; and FIG. 3 is an enlarged view of an upper perforation of FIG. 2 after it has been squeezed with silicate.

BEST MODE FOR CARRYING OUT THE INVENTION

Referring more particularly to the drawings, FIG. 1 discloses a well 10 having a casing 11 extending throughout the depth of the wellbore which is secured in place by cement 13. Casing 11 is perforated to form perforations 14a, 14b adjacent producing formation 15 to provide flow passages for fluids from formation 15 into casing 11. A production tubing 16 having a tubing head 17 extends down within casing 11 from the surface 18 and has a packer 19 thereon to isolate the production interval of the wellbore as is known in the art. An outlet or return pipe 19a having a valve 20 therein is connected to tubing head 17 for a purpose discussed below.

As illustrated in FIG. 1, excess gas from an overlying gas cap or zone 21 will migrate downward into formation 15 as fluids are produced from formation 15 through perforations 14a and 14b. When the excess gas establishes communication with the upper perforations 14a, it flows therethrough and is produced with the other formation fluids, thereby causing an undesirably high gas-oil ratio in the produced fluids.

When the high gas-oil ratio is detected, a cement evaluation log or other equivalent commercially-available log is normally run to establish that the influx of excess gas is not due to a channel or crack in cement 13 behind casing 11. If cracks or channels are found in cement 13, a squeeze cementing operation is carried out to repair same, e.g. see co-pending U.S. patent application No. 760,259, filed July 29, 1985, now U.S. Pat. No. 4,627,496 for an example of such an operation. Also, a commercially-available temperature log is desirably run to determine the downhole temperature in the zone to be treated. This log will be used to determine the proper blend of silicate to achieve desired setting times. As these logs are being run, the depth of lower end 23 of tubing tail 24 (i.e. that portion of tubing 16 which extends below packer 19) is identified with a tubing tail locator or equivalent on the logging line (not shown). This measured depth is used later to confirm or adjust the depth of the coiled tubing nozzle which, in turn, is utilized in measuring depths during the following squeeze silicate operation of the present invention as will be discussed below. If cement 13 is found to be sound or if there is still excess gas flow after the squeeze cement operation, then the present method is carried out.

In carrying out the present invention the wellbore (i.e. casing 11 below packer 19 and tubing 16) is loaded with a loading liquid, (e.g. production water, dead crude, diesel or other liquid which is non-damaging to formation 15) to fluid pack the well and to displace any gas out of the wellbore. If there are lower perforations (e.g. oil-producing perforations 14b) in casing 11 which are not to be squeezed during the operation, these lower perforations must be protected with a temporary bridging agent 35. Coiled tubing 26 is used to spot the bridging agent 35 across the lower perforations 14b.

Coiled tubing 26 is a continuous length (e.g. 16,000 feet) made up of steel tubing (e.g. 1 to 1½" diameter) which is coiled onto a reel 28 and has its inner end 26a connected to pump 38 which, in turn, draws liquids from source 39. Coiled tubing 26 is fed into and out of well 10 through an injector head 29 which has driven track means 30 for gripping and moving tubing 26. Tubing 26 will normally be fed by injection head 29 through a standard blow-out preventor and/or stuffing box (neither shown) to allow pressure to be maintained in the wellbore as will be understood in the art. Coiled tubing units such as described are known and are commercially-available (e.g. Arctic Coiled Tubing, Inc., Anchorage, Alaska).

A tubing tail locater 31 is attached to the lower end of coiled tubing 26, just above nozzle 27. As shown, locater 31 is comprised of a pin 32 that is pivoted at 33 and is normally held in a vertical position (not shown) as locator 31 is lowered through tubing 16. Pin 32 falls to a horizontal position (FIG. 1) as locator 31 moves out of the lower end of tubing 16. When coiled tubing 26 is moved upward, horizontal pin 32 engages lower end 23 which temporarily stops the movement of coiled tubing 26. This increased resistance is noted at the surface and the length of coiled tubing 26 between the bottom 23 of tubing tail and the surface is noted. Power is increased to injector head 29 so the upward pull will shear pin 32 thereby allowing coiled tubing 26 to be removed through tubing 16. Of course, other known locators or equivalents can be used without departing from the present invention.

Coiled tubing 26 is lowered to the bottom of the wellbore and then raised upward as bridging agent 35 is flowed therethrough. Bridging agent 35 which will be described in detail below, is a material which will protect the lower perforations 14b during the squeeze operation but is such that it can easily be circulated out of the wellbore after the squeeze is completed. The density (i.e. weight per unit volume) of agent 35 is equal to or greater than the density of the sodium silicate whereby the silicate will be supported by the bridging agent and will not substantially mix therewith.

Well records and previously-run logs such as tubing tallies, electric line, and open hole caliper runs which are available for the well 10 being treated are used in correlating the various depths within the wellbore and in calculating the required volumes of the materials, (e.g. bridging agent, sodium silicate, etc.) to be used. The volume of bridging agent 35 is caluated to fill casing 11 to a point just about lower, oil-producing perforations 14b. As bridging agent 35 is being placed, additional loading fluid (e.g. diesel, water, etc.) is pumped down tubing 16 around coiled tubing 26 to maintain a pressure differential of several hundred psi against the face of the formation. Any loading liquid displaced by the bridging agent will flow through perforations 14a into formation 15. Once all of the bridging agent 35 has been placed, the pump rate down tubing 16 is increased to thereby increase the bottom hole pressure to a value equal to or greater than the pressure anticipated during the subsequent squeeze operation. Experience has shown that the bridging agent shrinks approximately 10% during this step due to spurt loss before filter cake forms. Once the filter cake forms, additional fluid losses from the bridging agent are negligable.

With bridging agent 35 in place across lower oil-producing perforations, the top of the bridging agent is checked with a commercially-available electric line fluid ID tool. If the top is above the perforations to be protected, the next step in the present method is carried out. If the top is below these perforations, additional bridging agent is added through coiled tubing 26.

Perforations 14a, which are to be squeezed are then flushed with fresh water to establish injection and to ensure that any salt or divalent-cations in the wellbore are removed. With the wellbore being fluid packed as described above, sodium silicate mixture 36 containing diverter material (to be described in detail below) is flowed down coiled tubing 26 and is squeezed into the formation through upper perforations 14a. Valve 20 is closed so no returns are taken from the wellbore during this step. The diverter in silicate mixture 36 builds up a filter cake 37 (FIG. 3) as silicate mixture 36 flows through perforations 14a and into formation 15. Once the filter cake 37 forms a barrier, no more silicate 36 can flow into formation 15. This prevents the silicate from penetrating deeply into the formation as is the case with prior art silicate squeeze methods. When filter cake 37 forms, the pump pressure will "bump" indicating that the formation will take no more silicate. Valve 20 is then opened and returns of loading liquid are taken from tubing 16 until all of the silicate 36 in coiled tubing 26 is dumped into the wellbore, after which the excess silicate is removed from the well by any of the following steps:

1. Allow the silicate to set in the wellbore and underream it out with an underreamer on coiled tubing 26.

2. Contaminate the silicate with a contaminant material that will retard the set time (such as caustic having a diverter therein), and then reverse out the contaminated silicate once the silicate in the formation has set. The contaminant material should be gelled or crosslinked to hold the diverter in suspension. Contaiminant diverter concentration should be designed such that penetration in to the formation is substantially prevented.

3. Dilute the silicate in the wellbore with water to such an extent that the silicate does not set or, at most, sets as a gel that can be easily jetted out. Again there is a need for a diverter/gelling of the dilutant to prevent weepage into the formation, and over-displacement of the silicate behind the casing.

4. Move above the maximum silicate height (assuming no silicate flowed through perforations 14a) and spot a pill of gelled water/diverter while taking returns out of well tubing 16. The coiled tubing 26 is then moved down the hole while pumping into the well tubing 16 and the liquid silicate is reversed out before it can set, leaving gelled water/diverter across the squeezed interval.

After the silicate is reversed out by one of the above steps, the well is then flow tested to determine if the perforations 14a are sealed. If so, bridging agent 35 is jetted or reversed out of the wellbore and the lower interval is jetted and/or reperforated to return the well to production. Now that the overall squeeze silicate method of the present invention has been described, the various liquids used in this method will now be discussed in greater detail.

TEMPORARY BRIDGING AGENT 35

As stated above, bridging agent 35 is a liquid which has a density (i.e. pounds per gallons) that is equal to or heavier than the density of the silicate 36 which is to be used in the squeeze silicate operation. The equal or heavier density of the bridging agent prevents any substantial mixing of the silicate with the bridging agent and insures that the silicate will be supported on and above the bridging agent during the squeeze operation.

Bridging agent 35 should have: (1) the ability to provide a competent seal for isolating and protecting lower perforations 14b against a substantial pressure differential (e.g. 2000 psi) at a high temperature (e.g. 200° F.); (2) rheological properties enabling pump down through coiled tubing 26; (3) properties which do not damage the permeability of formation 15; (4) ability to provide an easily identifiable interface with the silicate; and (5) ability to be easily removable from the wellbore by jetting with coiled tube 26. Examples of liquids which can be used as bridging agent 35 are as follows:

1. A heavily-weighted drilling mud, the formulation of which is well within the drilling mud art.

2. Gelled or crosslinked, saturated brines that have bridging agents such as sized salt or sized calcium carbonate to cause flash setting or gellation when contacted by sodium silicate. This has the advantage of assuring that the lower perforations 14b are totally protected from silicate damage since only the liquid silicate is formation invasive. One slight disadvantage of brines is that the flash set interface may be difficult to remove by jetting. However, it can be readily removed with an underreamer operable by coiled tubing 26. Gelling or crosslinking agents (e.g. hydroxyethylcellulose, zirconium oxychloride) and sized salts (e.g. Bridgesal, Watesal, Plugsal) are well known and are commercially-available from a number of sources. Although the brine does not have to be gelled or crosslinked, is preferred since it (1) prevents dilution/dissolution of the bridging agent and (2) increases the viscosity of the solultion to prevent settling of the bridging particles.

SODIUM SILICATE MIXTURE 39

The sodium silicate mixture 39 is comprised of sodium silicate, water, and activator (e.g. urea) and a diverter material. A number of inert materials capable of forming a filter cake can be used as the diverter material, e.g. bentonite, barite, silica flour, etc. The gellation time is controlled by the bottom hole temperature and the urea concentration. Any silicate concentration between 5 and 100% can be employed. The greater the concentration of silicate the higher the compressive strength of the final material when set. The diverter concentration is designed for the highest permeability expected to be encountered by the silicate mixture. The well can be re-squeezed with silicate having less diverter, if necessary. A typical silicate mixture is comprised of 90% sodium silicate, 10% water with 40–45 pounds per barrel of 46% $N_2$ urea and 0.5 pounds per barrel (of total solution) each of bentonite, barite, and 200 mesh and 325 mesh silica flour. This mixture comprising a major portion of sodium silicate and a minor portion of diverter material will set in 3–3.5 hours at 200° F.

What is claimed is:

1. A method for sealing selected perforations in the casing of a well to prevent flow through said perforations, said method comprising;

isolating the interval of the casing which lies adjacent said selected perforations to be sealed;

squeezing a sodium silicate mixture having a major portion of sodium silicate and a minor portion of a diverter material therein through said selected perforations and into the formation behind the perforations, said diverter material being a material capable of building a filter cake in said formation as the sodium silicate mixture flows therethrough to prevent further flow of sodium silicate mixture through said selected perforations once the filter cake is formed; and removing the excess sodium silicate mixture remaining in the casing.

2. The method of claim 1 including:

contaminating the excess sodium silicate mixture within the casing to retard the setting time of said excess sodium silicate mixture after said selected perforations have been squeezed.

3. The method of claim 1 including:

placing a removable bridging agent in the casing before squeezing said sodium silicate mixture through said selected perforations to isolate and protect other perforations in the casing below said selected perforations to be sealed; and removing said bridging agent after said selected perforations are squeezed.

4. The method of claim 1 wherein the density of said bridging agent is equal to or greater than the density of said sodium silicate mixture.

5. The method of claim 4 wherein said bridging agent comprises a heavily-weighted mud.

6. The method of claim 4 wherein said bridging agent comprises a heaviliy-weighted brine.

7. The method of claim 4 including:

maintaining a positive pressure within the casing until the sodium silicate solution within the formation sets.

8. A squeeze sodium silicate method for sealing upper perforations in a well having a casing throughout the wellbore, upper and lower perforations through said casing to establish fluid communication between the interior of said casing and a production formation adjacent said perforations, a well tubing string in said casing extending from the surface to the proximity of said perforations, and a packer means for sealing between said tubing and said casing above said perforations, said method comprising:

isolating said casing adjacent said upper perforations;

lowering a coiled tubing down said well tubing string to a point adjacent said upper perforations;

flowing a sodium silicate mixture through said coiled tubing and squeezing said mixture into said production formation through said upper perforations; said sodium silicate mixture comprised of: a major portion of sodium silicate, a silicate activator, and a minor portion of diverter material, said diverter material being capable of forming a filter cake within said formation as said silicate mixture flows through said upper perforations to form a barrier against further flow through said upper perforation thereby limiting the penetration of said silicate mixture into said formation; and removing the excess sodium silicate mixture from said casing after said upper perforations have been squeezed.

9. The method of claim 8 including:

loading said well tubing and said casing adjacent said perforations with a loading fluid before squeezing said upper perforations.

10. The method of claim 9 wherein the step is isolating said casing adjacent said upper perforations includes:

flowing a temporary bridging agent into said casing to isolate and protect said lower perforations during the squeezing of said upper perforations, said temporary bridging agent having a density equal to or greater than said sodium silicate mixture.

11. The method of claim 10 wherein said temporary bridging agent is comprised of a heavily-weighted drilling mud.

12. The method of claim 11 wherein said temporary bridging agent is comprised of a heavily-weighted brine.

13. The method of claim 10 wherein said diverter material is selected from the following group: bentonite, barite; silica flour.

14. The method of claim 10 wherein the step of removing said excess sodium silicate mixture includes:

contaminating excess sodium silicate mixture remaining in the casing after said upper perforations are squeezed to retard the setting time thereof; and removing the contaminated sodium silicate mixture from said casing.

15. The method of claim 10 including:

maintaining a positive pressure within said casing until said sodium silicate mixture has set in said formation.

16. The method of claim 15 including:

removing said temporary bridging agent from said casing after said upper perforations have been squeezed.

* * * * *